(12) United States Patent
Jaena et al.

(10) Patent No.: US 10,840,689 B2
(45) Date of Patent: Nov. 17, 2020

(54) UNIVERSAL TAP-OFF BOX WITH A LATCH MECHANISM

(71) Applicant: POWER DISTRIBUTION, INC., Richmond, VA (US)

(72) Inventors: Mario L. Jaena, Kent, WA (US); Yasushi Richard Shimabukuro, Tustin, CA (US)

(73) Assignee: POWER DISTRIBUTION, INC., Richmond, VA (US)

(*) Notice: Subject to any disclaimer, the term of this patent is extended or adjusted under 35 U.S.C. 154(b) by 44 days.

(21) Appl. No.: 16/154,965

(22) Filed: Oct. 9, 2018

(65) Prior Publication Data

US 2019/0199077 A1    Jun. 27, 2019

Related U.S. Application Data

(60) Provisional application No. 62/568,902, filed on Oct. 6, 2017.

(51) Int. Cl.
| | |
|---|---|
| *H01R 25/00* | (2006.01) |
| *H02G 5/08* | (2006.01) |
| *H01H 9/22* | (2006.01) |
| *H01R 25/14* | (2006.01) |
| *H02G 3/16* | (2006.01) |
| *H02G 5/06* | (2006.01) |

(52) U.S. Cl.
CPC ............... *H02G 5/08* (2013.01); *H01H 9/22* (2013.01); *H01R 25/145* (2013.01); *H02G 3/16* (2013.01); *H02G 5/061* (2013.01)

(58) Field of Classification Search
CPC .. H01R 25/142; H01R 25/145; H01R 25/147; H02G 5/08; H02G 3/16; H02G 5/061
USPC .......................... 439/114, 115, 118, 122, 212
See application file for complete search history.

(56) References Cited

U.S. PATENT DOCUMENTS

| | | | |
|---|---|---|---|
| 3,611,252 A | 10/1971 | Fremont | |
| 4,790,766 A * | 12/1988 | Booty, Sr. ............ | H01R 25/142 439/117 |
| 6,079,992 A * | 6/2000 | Kuchar ................... | F21V 17/14 362/287 |
| 6,329,810 B1 | 12/2001 | Reid | |
| 6,809,509 B2 | 10/2004 | Bruno et al. | |

(Continued)

FOREIGN PATENT DOCUMENTS

DE       1020 10036081 A1    3/2012

*Primary Examiner* — Hae Moon Hyeon
(74) *Attorney, Agent, or Firm* — Bacon & Thomas, PLLC

(57) ABSTRACT

A tap-off box includes a latch that automatically secures the tap-off box to a busway upon insertion of a mast into the busway. The latch is in the form of a single spring-loaded member that latches onto a rail as the masthead is pushed into the busway. A push button actuated camming member pushes the latch away from the rail to enable the masthead to be withdrawn from the busway. The push button and camming member are independent of the mechanism that extends and retracts the contacts while the masthead is inserted and latched into the busway. The tap-off box may also include non-contact current monitoring sensors with voltage sensing inserts that an auxiliary breaker switch in applications other than a tap-off box, and an infrared emitting faceplate that can be adapted for monitoring a variety of breakers from outside the tap-off box.

20 Claims, 17 Drawing Sheets

(56) References Cited

U.S. PATENT DOCUMENTS

| | | | |
|---|---|---|---|
| 6,963,195 B1* | 11/2005 | Berkcan | G01R 15/181 |
| | | | 324/117 R |
| 7,477,058 B2 | 1/2009 | Montreuil | |
| 7,652,871 B2 | 1/2010 | Caggiano et al. | |
| 7,819,676 B1* | 10/2010 | Cardoso | H01R 13/245 |
| | | | 439/115 |
| 8,421,443 B2 | 4/2013 | Bitsch et al. | |
| 8,508,212 B2* | 8/2013 | El-Essawy | G01R 35/04 |
| | | | 323/277 |
| 8,680,845 B2* | 3/2014 | Carpenter | G01R 1/22 |
| | | | 324/156 |
| 8,899,999 B2* | 12/2014 | Mackiewicz | F21S 8/038 |
| | | | 439/118 |
| 9,000,752 B2* | 4/2015 | El-Essawy | G01R 33/0283 |
| | | | 324/126 |
| 9,007,077 B2* | 4/2015 | El-Essawy | G01R 15/207 |
| | | | 324/117 H |
| 9,063,184 B2* | 6/2015 | Carpenter | G01R 33/02 |
| 9,146,259 B2 | 9/2015 | Blake et al. | |
| 9,379,502 B2* | 6/2016 | Davidson, Jr. | H01R 25/142 |
| 10,135,209 B1* | 11/2018 | Wynnik | H01R 25/162 |
| 10,211,581 B2* | 2/2019 | Wynnik | H01R 13/22 |
| 10,454,415 B2* | 10/2019 | Ledgerwood | H02G 3/03 |
| 2005/0162252 A1 | 7/2005 | Kangas | |
| 2007/0069715 A1* | 3/2007 | Bruno | G01R 21/133 |
| | | | 324/76.11 |
| 2013/0027162 A1* | 1/2013 | Carlino | H01F 38/30 |
| | | | 336/90 |
| 2014/0167787 A1 | 6/2014 | Sanchez et al. | |
| 2014/0210453 A1 | 7/2014 | El-Essawy et al. | |
| 2015/0219691 A1* | 8/2015 | Cook | G01R 15/183 |
| | | | 324/127 |
| 2016/0274153 A1* | 9/2016 | Deokar | G01R 19/2513 |
| 2017/0184638 A1* | 6/2017 | Moon | G01R 31/382 |
| 2019/0324075 A1* | 10/2019 | Kinsella | H01F 38/30 |

* cited by examiner

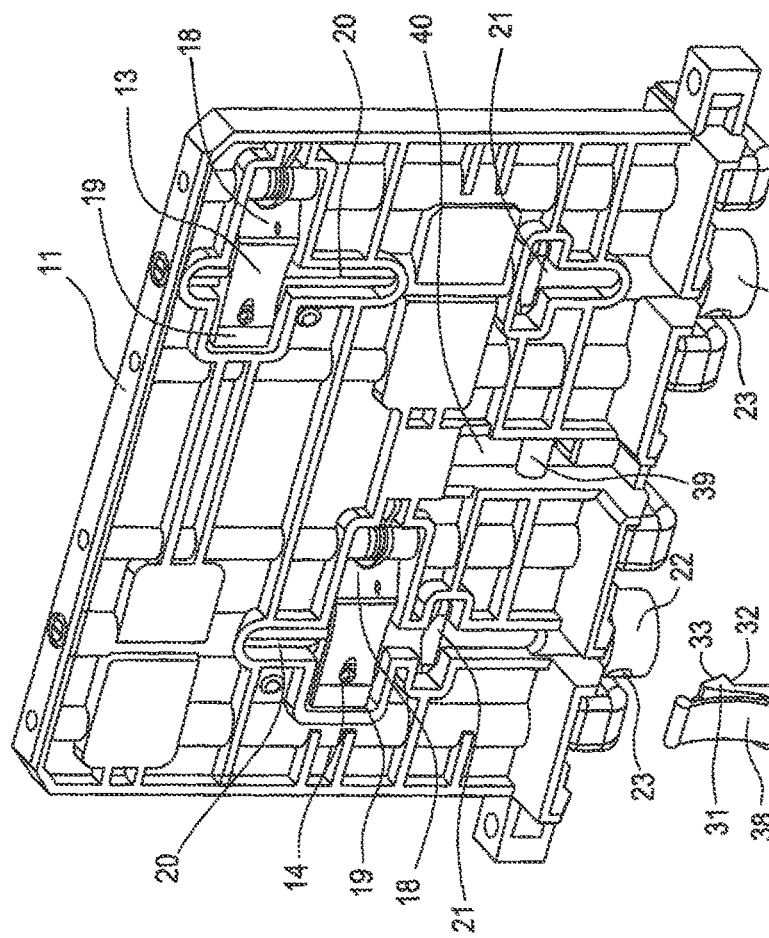
FIG. 4
FIG. 9
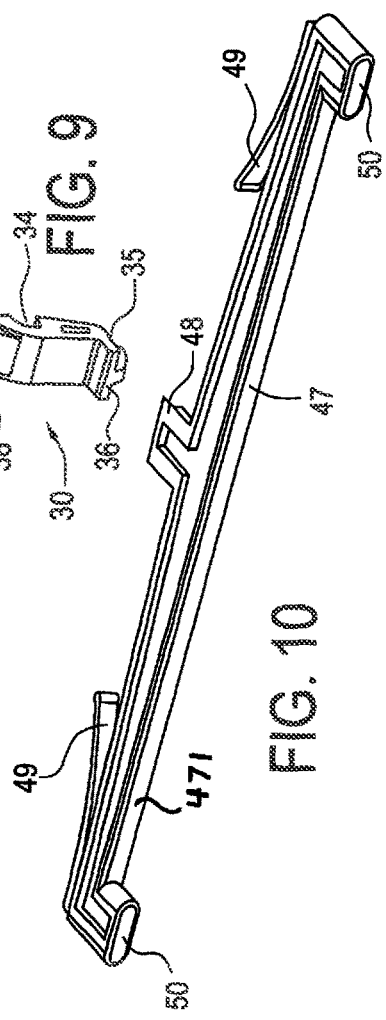
FIG. 10
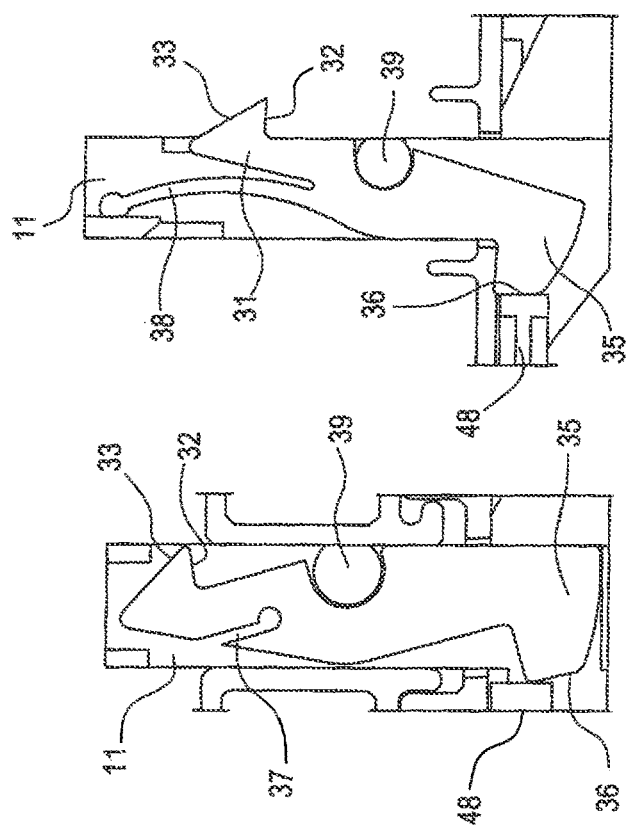
FIG. 8
FIG. 7

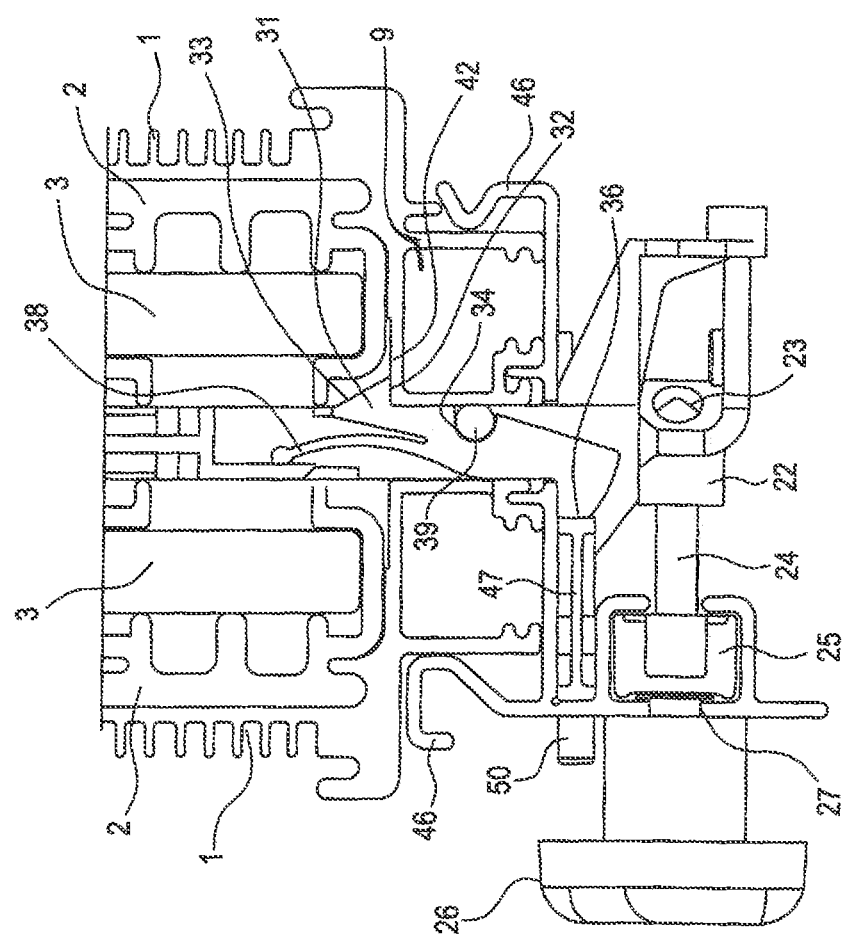
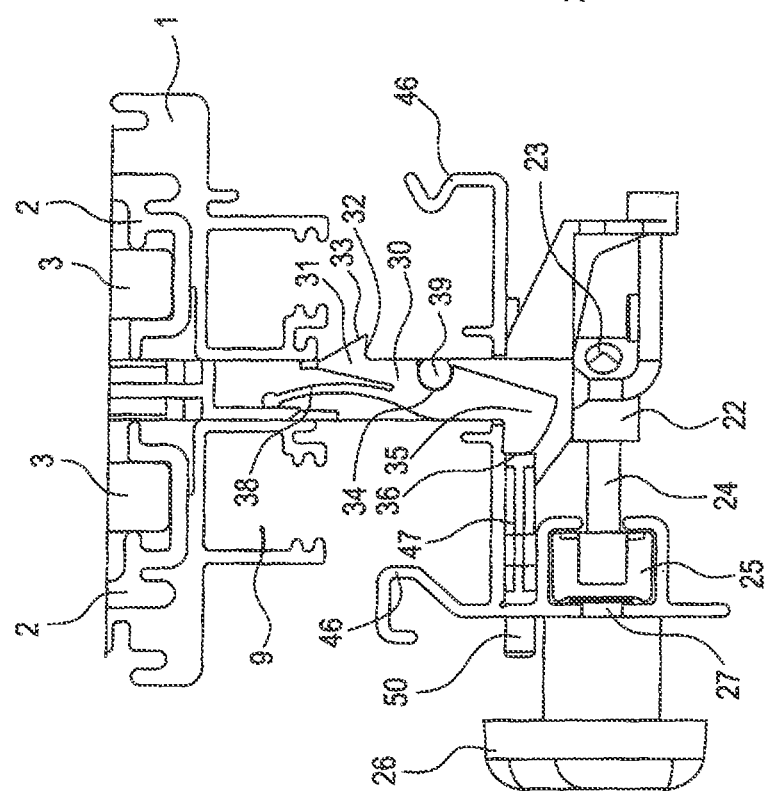

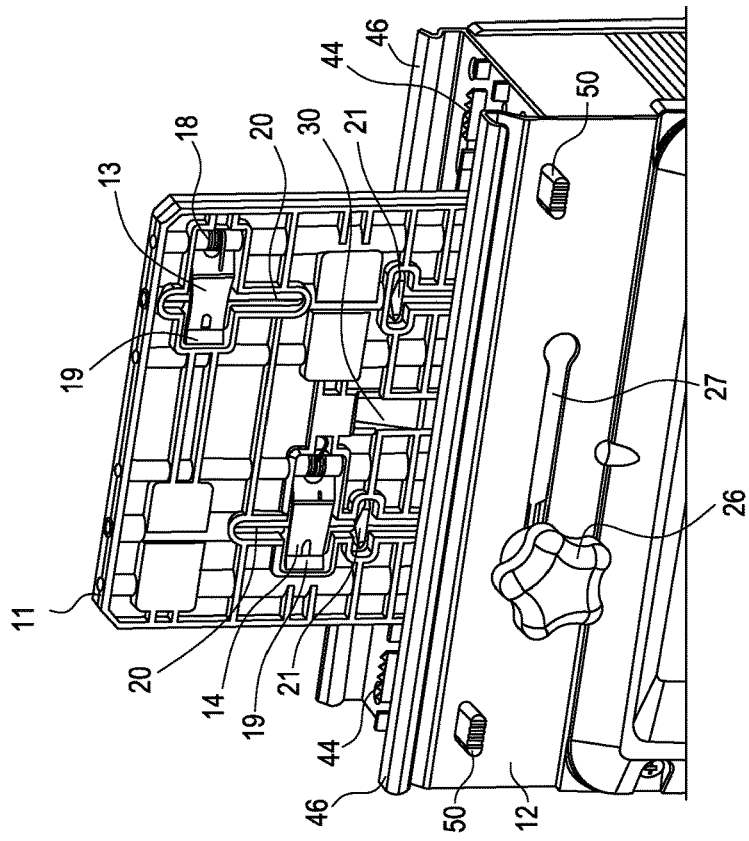
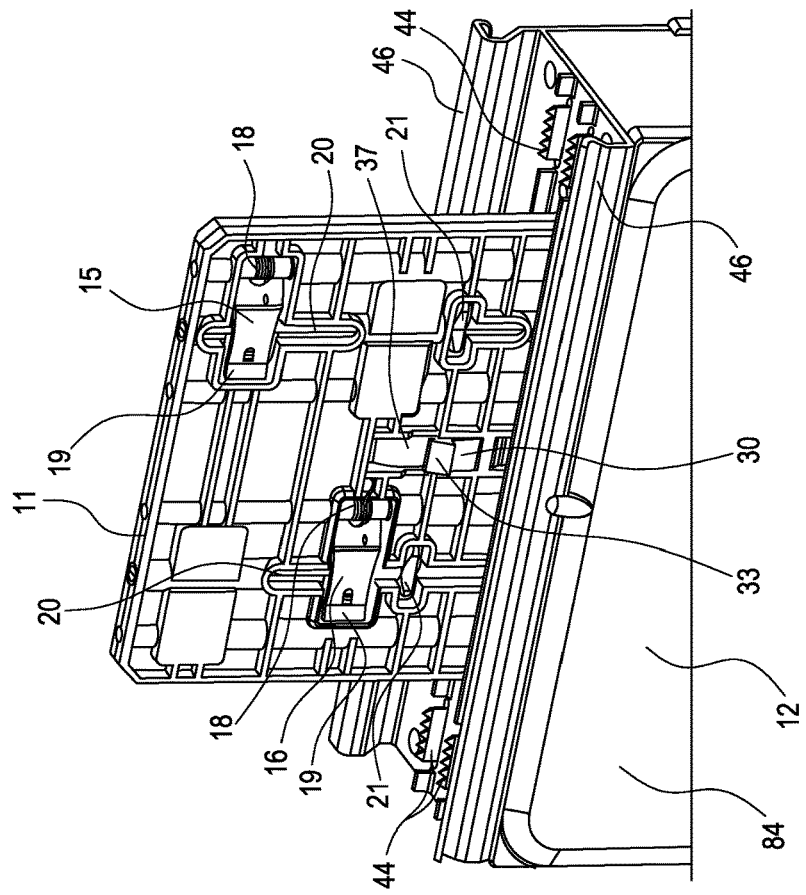

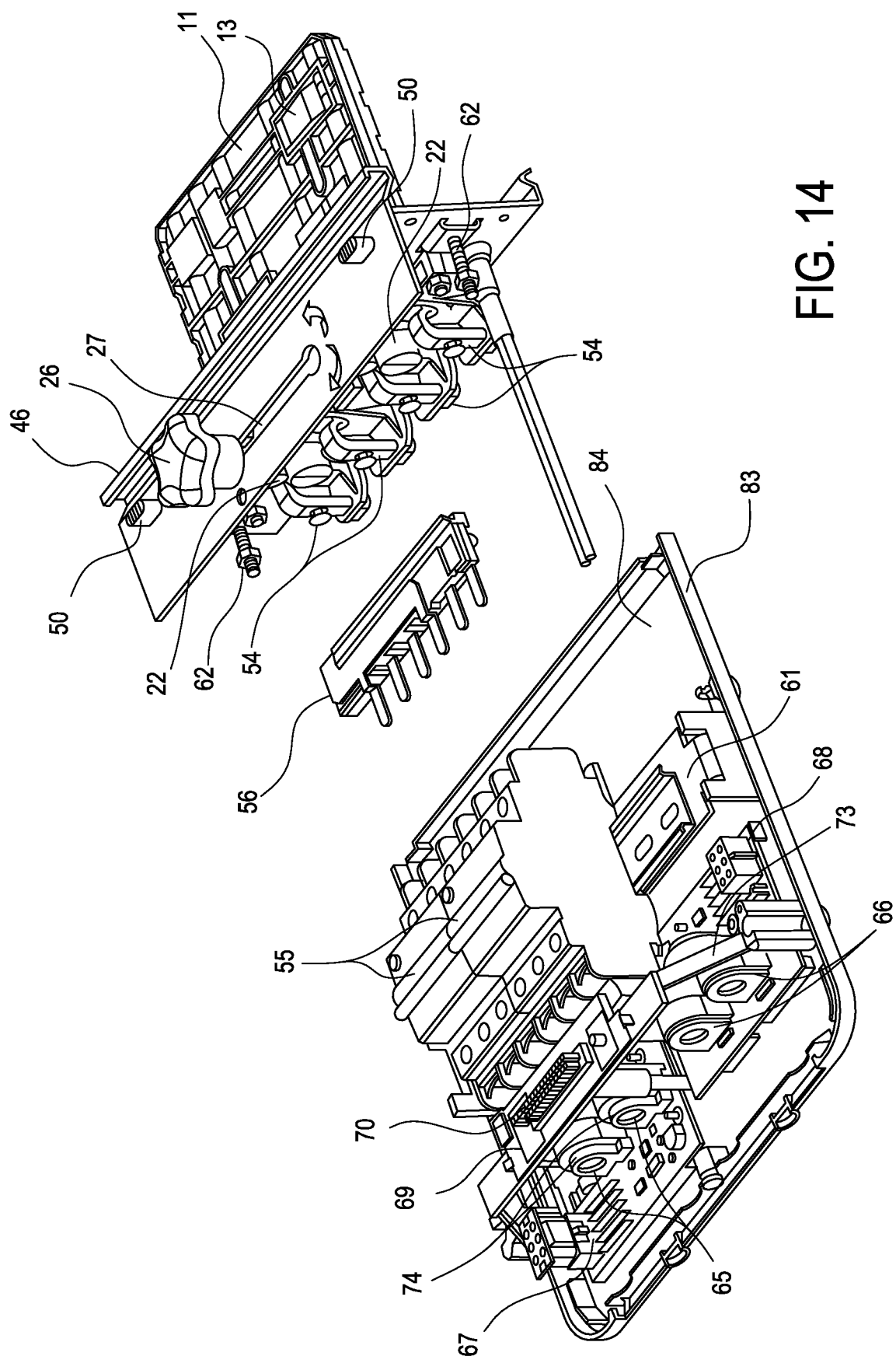

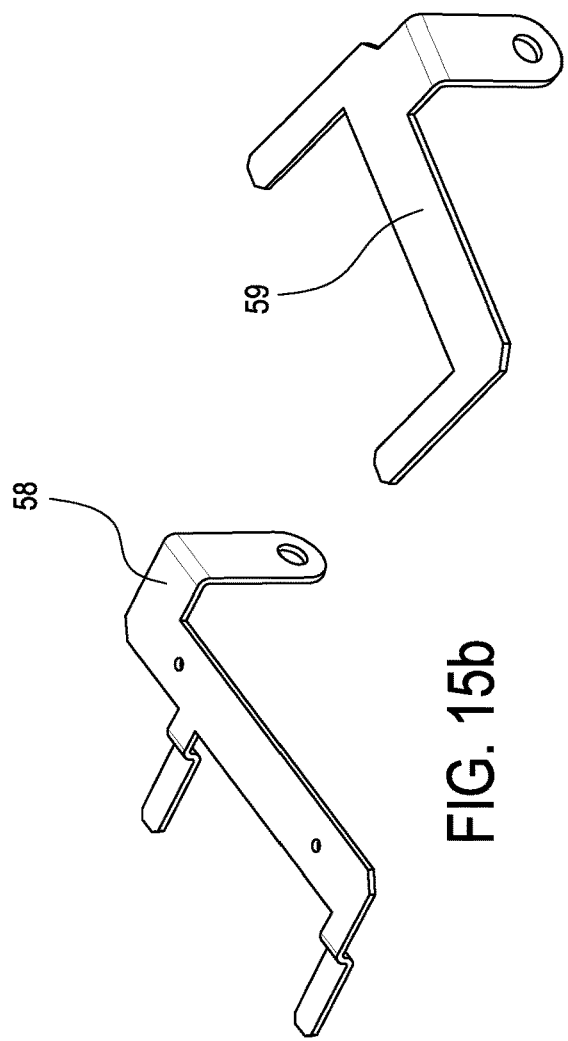
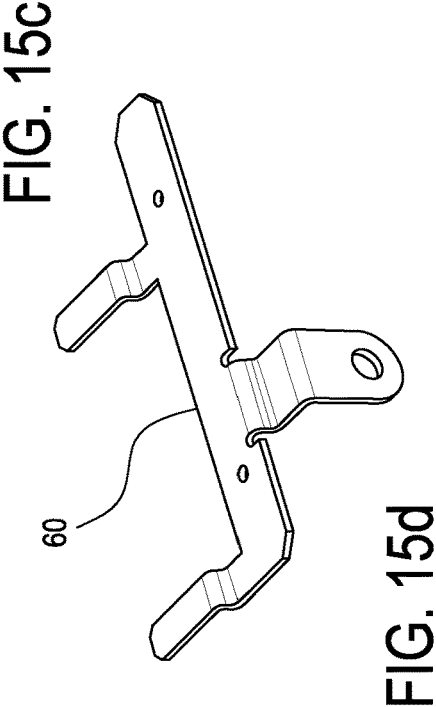
FIG. 15c
FIG. 15b
FIG. 15d
FIG. 15a
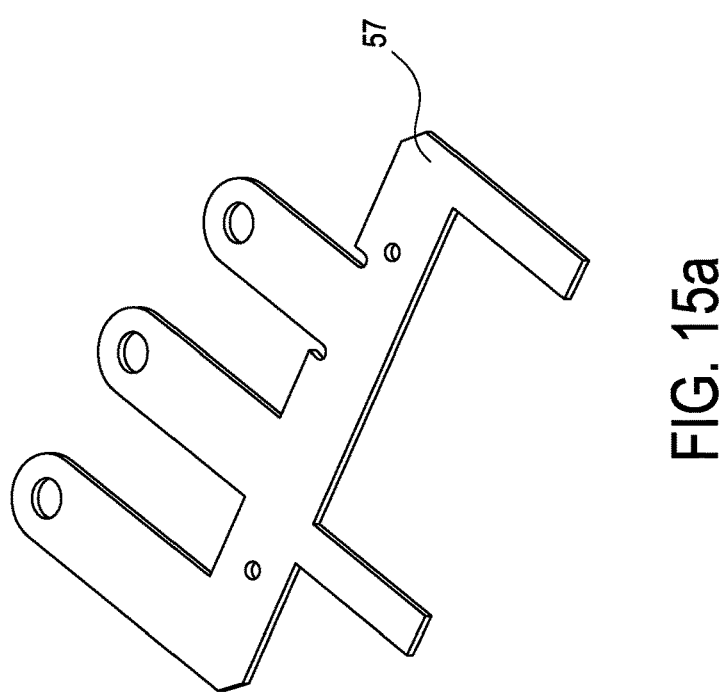

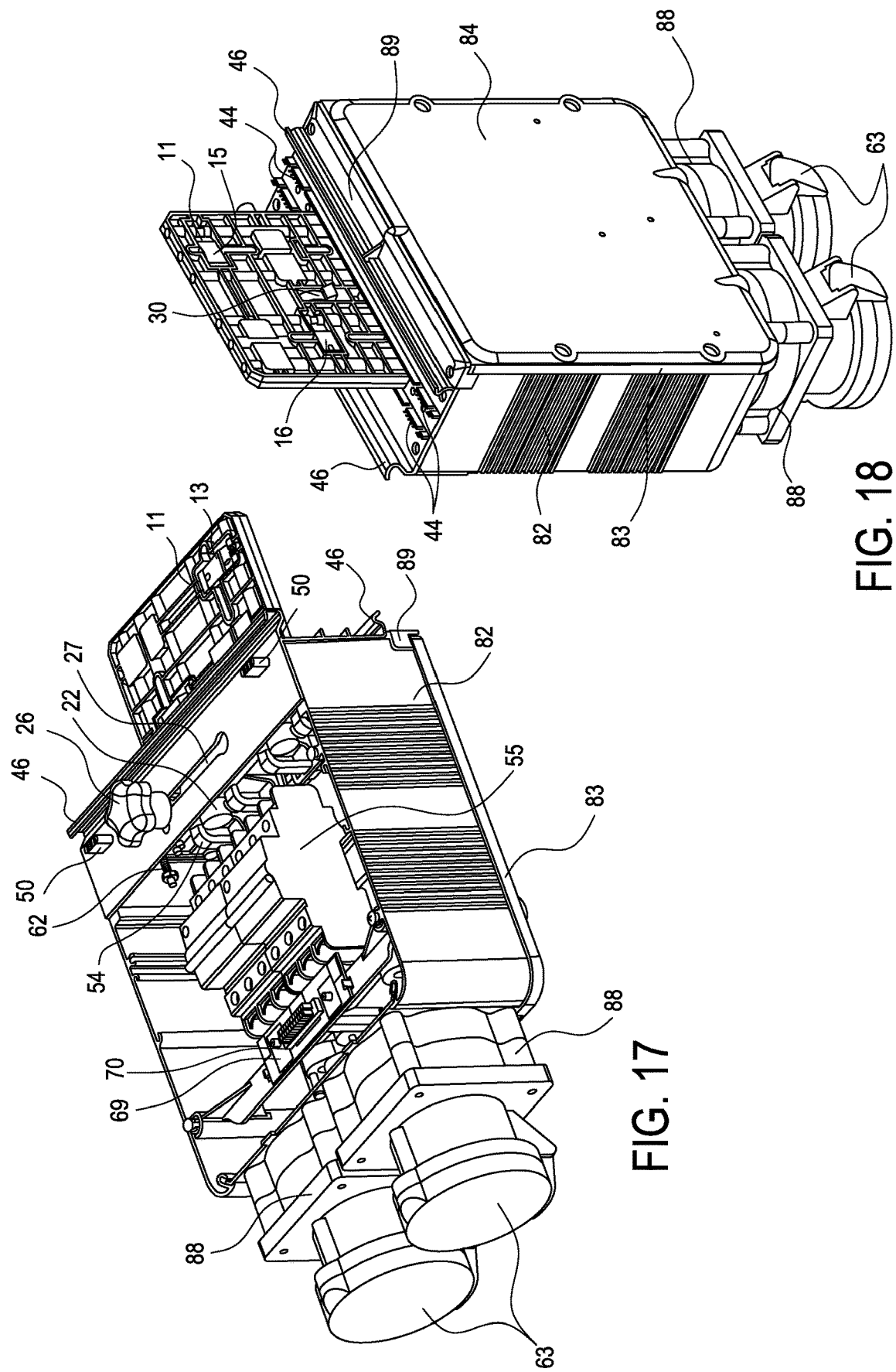

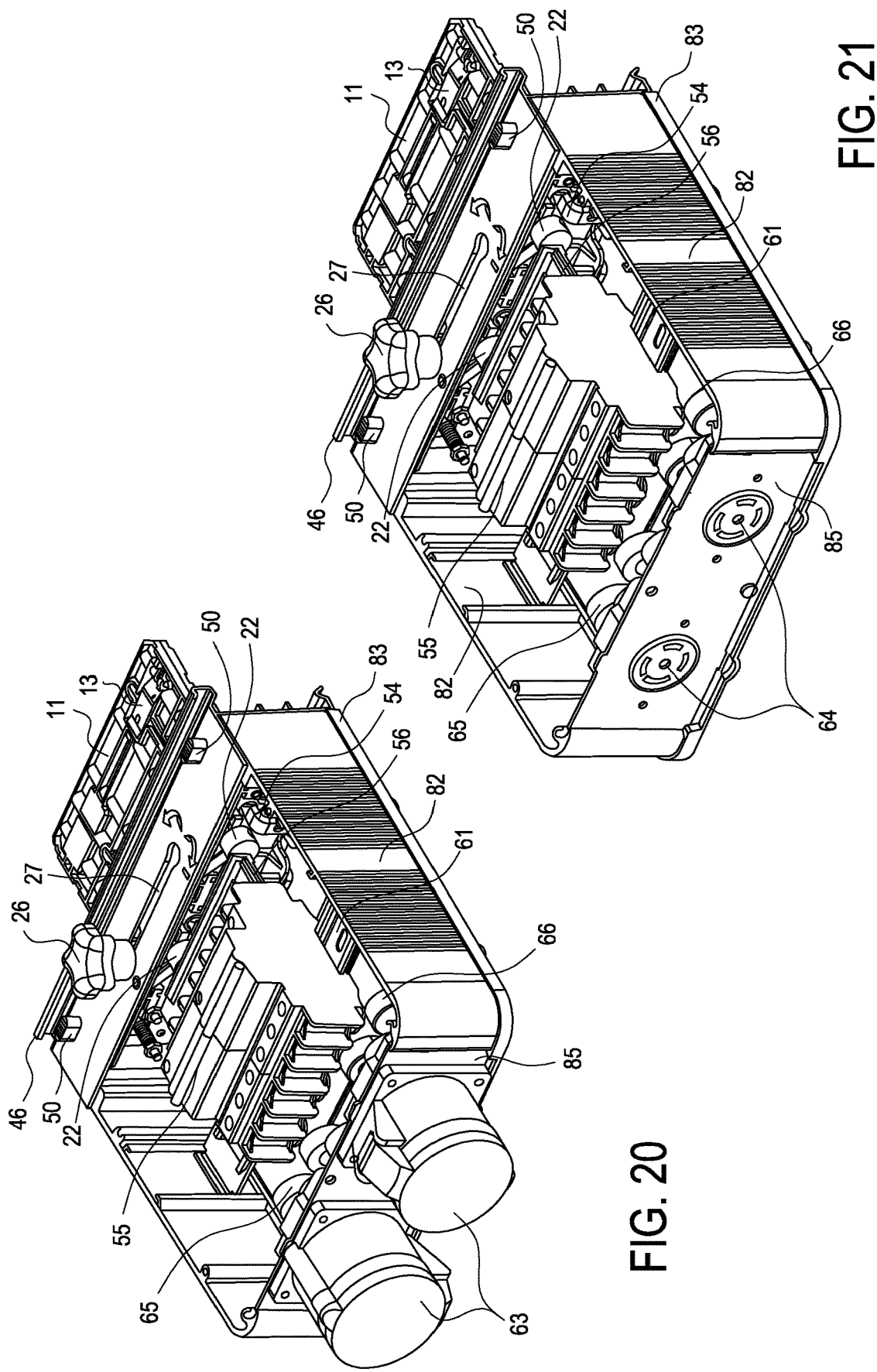

UNIVERSAL TAP-OFF BOX WITH A LATCH MECHANISM

BACKGROUND OF THE INVENTION

1. Field of the Invention

This invention relates to a system for distributing electrical power from a junction box to electrical devices via conductors installed in a power track, referred to herein as a busway. More particularly, the invention relates to distribution sub-assemblies or power taps, referred to herein as tap-off boxes, that may be removably connected to the busway or track at arbitrary locations without shutting down the power supply.

The tap-off boxes of the invention include a number of improvements, including the addition of a mechanism for automatically latching the tap-off box to the busway, current transformer (CT) sensor assemblies that detect breaker status in addition to monitoring currents distributed via the tap-off box, and replaceable faceplates that permit thermal scanning of internal components from outside the tap-off box.

A preferred embodiment of the tap-off box includes optional but advantageous features that allow the sub-assemblies or power taps to be adapted to or configured for a wide variety of busway applications and electrical device requirements, so that the tap-off box may be referred to as a "universal" tap-off box.

The invention also relates to an improved CT sensor that detects tripping of a breaker, in addition to monitoring currents, and that may be used in a power distribution sub-assembly or power tap for a busway or track, as well as in other current-sensing applications.

2. Description of Related Art

The rigorous demands of mission critical data center sites require methods to quickly disconnect and reconnect equipment without removing power from any other equipment. Additionally, all power distribution systems of the type used in mission critical data centers and other sites requiring continuous power distribution to multiple devices must be capable of providing monitoring of power parameters both locally and remotely. An example of such a power distribution system is disclosed in U.S. Pat. No. 7,819,676, assigned to Power Distribution, Inc. and incorporated herein by reference.

FIG. 1 is a perspective view of a section of the power track or busway illustrated in U.S. Pat. No. 7,819,676. The busway is made up of a power track housing assembly that supports isolated high current conductors. A commercial version of the illustrated busway is sold by Power Distribution, Inc. as part of the POWERWAVE™ and POWERWAVE 2™ bus systems. As illustrated in FIG. 1, the busway housing assembly includes a housing or enclosure 1; insulators 2; the high current conductors or bus bars 3; and auxiliary sub-channels 9 that may contain communications components, such as data signal-carrying electrical or fiber optic communications cable 7 and data connectors 4 for connecting the cable to monitoring circuitry in the individual tap-off boxes, and/or an isolated ground conductor for engaging a corresponding ground element (not shown) extending from the tap-off box. Housing or enclosure 1 may further include grooved runways 6 extending along the top and sides of the housing assembly for mounting or securing electromagnetic interference (EMI) shielding and/or mounting plates (not shown) that enable the busway to be secured to a ceiling or overhead mounting structure.

It will be appreciated that the present invention may be applied to or used with busway systems other than the one disclosed in U.S. Pat. No. 7,819,676, or the PowerWave™ bus systems, and that features of the tap-off box may be varied to accommodate the different bus systems without departing from the scope of the invention. On the other hand, it is to be understood that the preferred embodiment of the invention shares features with the PowerWave™ bus system, including spring contacts that engage the conductors or bus bars 3, and a spring contact camming mechanism that is activated, as described below, by a slidable and rotatable knob.

One of the improvements offered by the present invention relates to securing of the tap-off box to the busway, and in particular to a latching mechanism that is independent of the contact-engagement mechanism, and that automatically latches the tap-off box in place before the camming mechanism is activated to cause the spring contacts to engage respective conductors in the busway. The inclusion of an independent latching mechanism ensures that the tap-off box is properly positioned at the time the contacts are engaged so as to ensure a proper connection and avoid damaging the contacts, while also preventing the tap-off box from being unintentionally pulled from the busway while the contacts are engaged, which could cause damage to the contacts or busway and present a serious safety hazard.

Unlike known tap-off box latching mechanisms, the latching mechanism of the invention does not require a complex interlock with the contact-engaging mechanism, and furthermore does not require any action on the part of the installer other than insertion of the tap-off box contact mast into the busway. In contrast, prior tap-off box arrangements having independent latching mechanisms, such as the ones disclosed in U.S. Pat. No. 3,611,252 and German Publication No. DE102010036081, have required some sort of manual intervention on the part of the installer to secure the tap-off box after the mast has been inserted into the track or busway.

For example, the tap-off box securing mechanism of U.S. Pat. No. 3,611,252 uses a spring-biased member that automatically extends into a slot only after a mast of the tap-off box has been inserted into the track and the tap-off box and mast have been rotated into a final contact-engaging position. In this arrangement, a spring-biased blocking member prevents rotation of the tap-off box back to a position at which it can be removed. On the other hand, the tap-off box latching mechanism disclosed in German Patent Publication No. DE102010036081 provides positive latching of a tap-off box upon purely linear insertion of a contact assembly into the track, without any rotation, but requires a complex "connecting mechanism" consisting of dual axially opposed spring-biased "connecting elements" that snap-on to latch the tap off box to the rail by engagement between bearing surfaces on the connecting elements and abutment surfaces on the rail, and further requires an additional "locking mechanism" operated by a handle in order to both initially prevent movement of the locking elements in a disengaging direction, and also to move the locking elements in a disengaging direction.

Other examples of non-automatic tap-off box latching mechanisms include those disclosed in U.S. Pat. No. 7,744,386 and PCT Patent Publication Nos. WO 94/24731 and WO 97/00167, in which the latch and contacts are actuated and withdrawn together by a common switch or lever; U.S. Pat. No. 9,379,502, which discloses a latching mechanism operated independently from the contact engaging/disengaging mechanism, but in which the latching mechanism is still lever-operated in both the latching and unlatching directions; and U.S. Pat. No. 3,686,614, which discloses a latching mechanism that is lever-operated to move a latching member in the latching direction, against a spring bias in the unlatching direction (which is operated the direction needed to achieve automatic latching).

Finally, by way of further background, non-automatic tap-off box securing mechanisms or means that are neither automatic actuated by levers, cam, or the like include those of PCT Publication No. WO2012/032381, which describes a tap off box latching arrangement actuated by a cover interlock; U.S. Pat. No. 2,861,139, which discloses a cover-operated interlock for the contacts only, and in which the tap-off box is secured to the bus by screws; U.S. Pat. No. 2,984,769, which discloses a tap off-box with cover-contact interlock that is simply hung from the busway by hooks; and U.S. Pat. No. 2,888,529, which discloses a cover-operated interlock between a load switch and the contacts.

Another improvement offered by the present invention relates to monitoring of current in a branch circuit carried by the tap-off box, and in particular to the use of a new type of non-contact current sensor in which is installed a plastic or graphite voltage-sensing insert that provides an anchor for the current sensor and that replaces an auxiliary circuit breaker trip detection switch to detect tripping of a respective circuit breaker in the corresponding branch circuit.

It is known to use arrays of current transformer (CT) sensor components to non-invasively monitor current in branch circuits, both in connection with a breaker panel board and also in a tap-off box. Such CT sensor arrays are disclosed, for example, in U.S. Pat. Nos. 8,421,443 and 6,809,509. Other conventional CT sensor arrays and housing configurations are disclosed in U.S. Patent Publication Nos. 2014/0210453; 2014/0167787; and 2005/0162252, and U.S. Pat. Nos. 9,146,259; 8,680,845; 8,421,443; 7,652,871; 7,477,058; and 6,329,810. Of these, U.S. Pat. No. 8,421,443 is of interest because the CT sensor assembly an additional component, in the form of a memory chip 226, embedded in the individual transformer housing. However, none of the conventional current sensors have a way to detect whether an absence of current is caused by a tripped circuit breaker or just normal operation of the branch circuit. Instead, it has heretofore been necessary to provide an auxiliary circuit breaker trip detection switch operated by the movable contact arm assembly of the breaker to detect whether a current interruption has been caused by tripping of the breaker. While effective, the inclusion of auxiliary breaker trip detection switches in a multiple-breaker tap-off box, where space may be at a premium, is inconvenient and costly. Furthermore, each different type of breaker will require a different auxiliary trip detection switch. Because the trip detection switch is mechanically connected to the breaker, there is no way to provide a single auxiliary switch that can be used with multiple circuit breaker configurations.

Another especially advantageous feature that may be provided in the tap-off box of the present invention is a replaceable faceplate made of a material transparent to infrared radiation so as to permit infrared scanning of breakers from outside the tap-off box, and that may be replaced by a different infrared radiation transparent faceplate to accommodate different breaker configurations without having to replace the entire cover. By way of background, Power Distribution, Inc.'s U.S. Pat. No. 7,819,676 discloses a cover made of infrared transmissive material to facilitate infrared scanning of internal components. (col. 8, lines 19-22), but not with a variable configuration breaker faceplate for diverse types of breakers.

SUMMARY OF THE INVENTION

It is accordingly an objective of the invention to provide an improved tap-off box for a power distribution busway system.

It is also an objective the invention to provide an improved latching arrangement for a tap-off box.

It is a further objective of the invention to provide an improved current sensor arrangement for a tap-off box.

It is yet another objective of the invention to provide an improved IR monitoring faceplate arrangement for a tap-off box.

These objectives are achieved, according to one aspect of the invention, by a tap-off box that includes a latching mechanism that automatically secures the tap-off box to the busway upon insertion of a spring contact-carrying mast into the busway. Automatic latching of the tap-off box enables the spring contacts to be safely moved by an installer into engagement with conductors in the busway.

According to a preferred embodiment of the invention, the latch is in the form of a single spring-loaded member that latches onto a rail as the masthead is pushed into the busway. A push button actuated camming member pushes the latch away from the rail to enable the masthead to be withdrawn from the busway. The push button and camming member are independent of the mechanism that extends and retracts the spring contacts while the masthead is inserted and latched into the busway.

The objectives of the invention are also achieved by a tap-off box with circuit breaker monitoring that does not require an auxiliary breaker trip detection switch or other space-occupying components, but rather is provided by a voltage sensing insert that fits into the current monitoring CT sensors, and that can be used with any circuit breaker configuration. The voltage-sensing insert may also be used to replace an auxiliary breaker switch in applications other than a tap-off box.

Still further objectives of the invention are achieved by a tap-off box with a cover configured to include a replaceable infrared transmitting faceplate that can be adapted for a variety of different breaker configurations. According to a preferred embodiment of the invention, the cover may also include a replaceable current monitoring module with breaker status indicator lights.

These and other features of the present invention will become apparent from the following description and accompanying drawings.

BRIEF DESCRIPTION OF THE DRAWINGS

FIG. 4 is an isometric view of a mast included in the tap-off box of the preferred embodiment.

FIGS. 5 and 6 are side views showing operation of a latching mechanism as the tap-off box of the preferred embodiment is inserted into a busway of the type illustrated in FIG. 1.

FIGS. 7 and 8 are side views showing variations of a latch member for the latching mechanism illustrated in FIGS. 5 and 6.

FIG. 9 is an isometric view of the latch member illustrated in FIG. 8.

FIG. 10 is an isometric view of an unlatching mechanism for the latching mechanism illustrated in FIGS. 5 and 6.

FIG. 11 is an isometric view, taken from the rear, showing further details of the mast of FIG. 4.

FIG. 12 is an isometric view, taken from the front, showing further details of the mast of FIG. 4 and latching/unlatching and contact-engaging mechanisms for the tap-off box of the preferred embodiment.

FIG. 14 is an exploded view of the components shown in FIG. 13.

FIGS. 15a to 15d show parts of a laminated bus bar for use in the tap-off box of the preferred embodiment.

FIG. 17 is an isometric view corresponding to that of FIG. 16, with an added receptacle externder.

FIG. 18 is an isometric view, taken from the rear, with an added cover adapter to allow increased enclosure depth.

FIGS. 20 and 21 are isometric views showing alternative receptacle top panel configurations for the tap-off box of the preferred embodiment.

DETAILED DESCRIPTION OF THE PREFERRED EMBODIMENTS

Throughout the following description and drawings, like reference numbers/characters refer to like elements. It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

Figure 1:
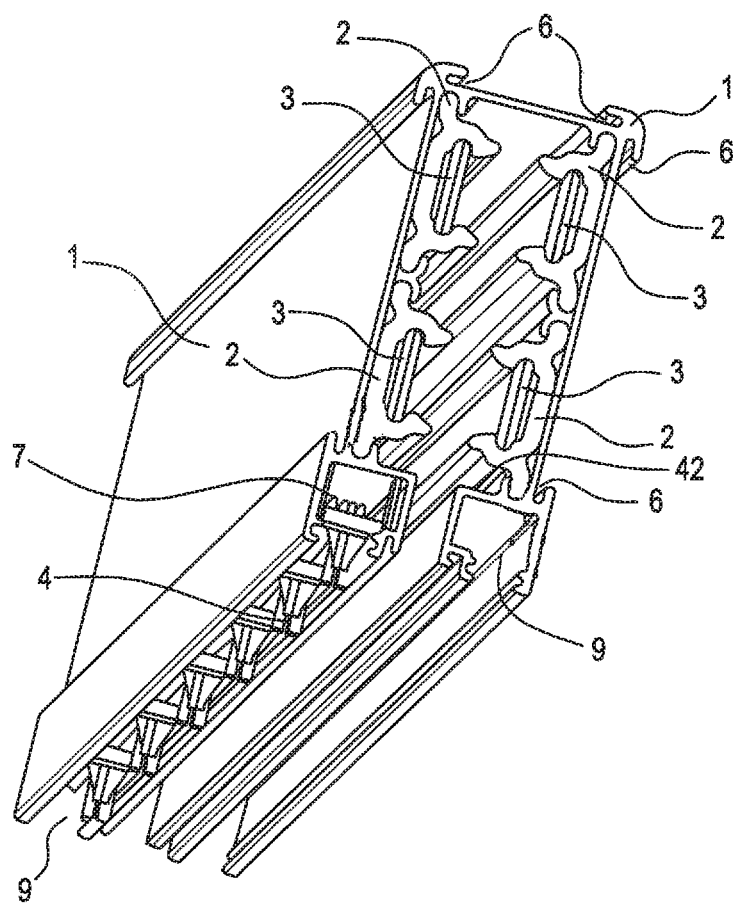
FIG. 1 is an isometric view of a conventional busway to which the tap-off box of a preferred embodiment of the present invention may be installed.

FIGS. 2-12 show a latching mechanism and a contact-engaging mechanism for a universal tap-off box according to a preferred embodiment of the invention. The tap-off box includes a generally planar quadrilateral mast 11 that extends from a tap-off box housing 12. Mast 11 supports four spring contacts 13-16, two of which (13,14) are on a front side of the mast 11, as shown in FIG. 12, and two of which (15,16) are on the rear side of the mast 11, as shown in FIG. 11. The spring contacts 13-16 are positioned to engage conductors 3 on the two sides of a busway of the type illustrated in FIG. 1. Each of the contacts 13-16 is a generally rectangular plate spring attached at one end 18 to the mast 11 and having a distal, conductor-engaging edge 19 that rests against the mast when a camming mechanism is in an initial position, and that is cammed away from the mast against a restoring force of the spring when the camming mechanism is rotated to a conductor-engaging position after insertion of the mast 11 into the busway. The spring restoring force biases the spring contacts 13-16 towards the mast 11.

The camming mechanism includes posts 20, each having a cam shaped cross-section in portions of the respective posts that extend behind the spring contacts 13-16. The posts 20 are rotatably secured to the mast by clips 21, and each post includes a cylindrical base 22 having a radially extending bore 23 for receiving a horizontal crank post 24 attached to slider 25, visible in an end view in FIGS. 5 and 6. Slider 25 is in turn attached to a knob 26 that is slidable along a horizontal guide slot 27 near a top of the tap-off box housing 12.

Figure 2:
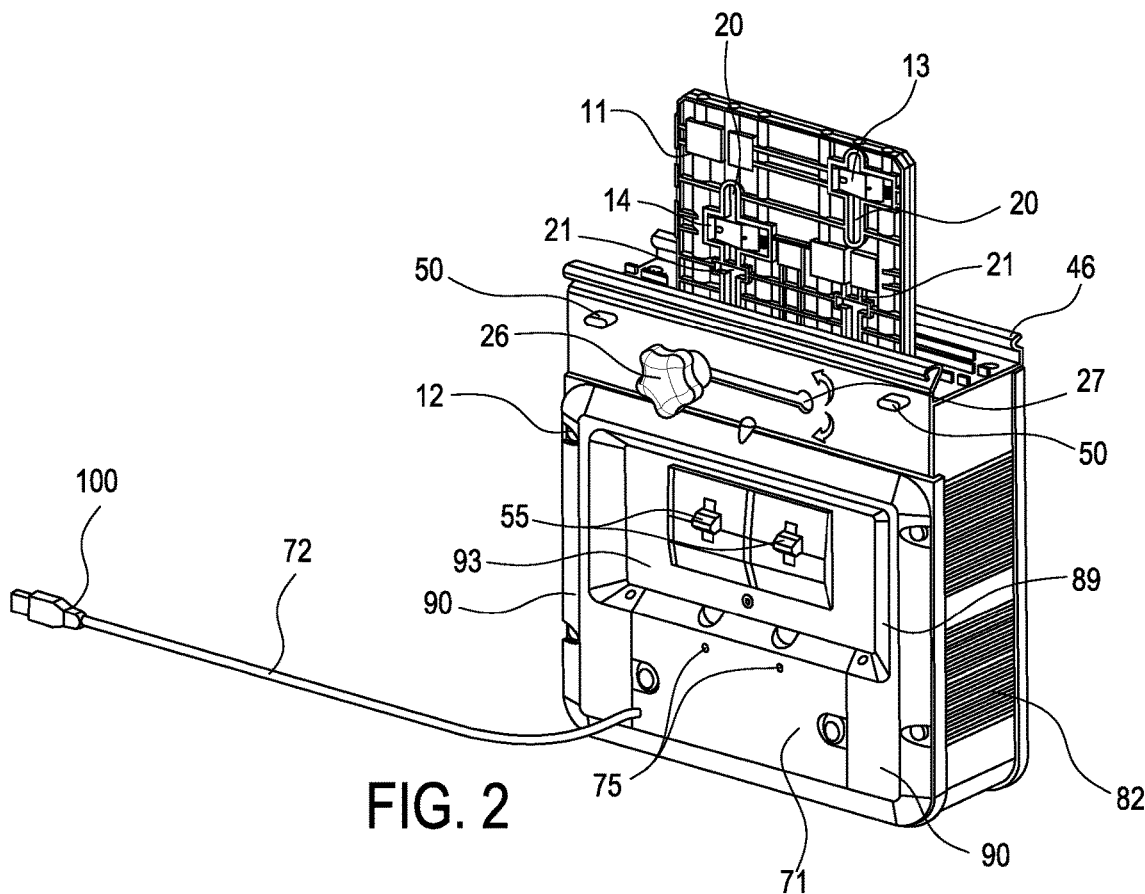
FIG. 2 is an isometric view, taken from the front, of a tap-off box constructed in accordance with the principles of a preferred embodiment of the present invention.
Figure 3:
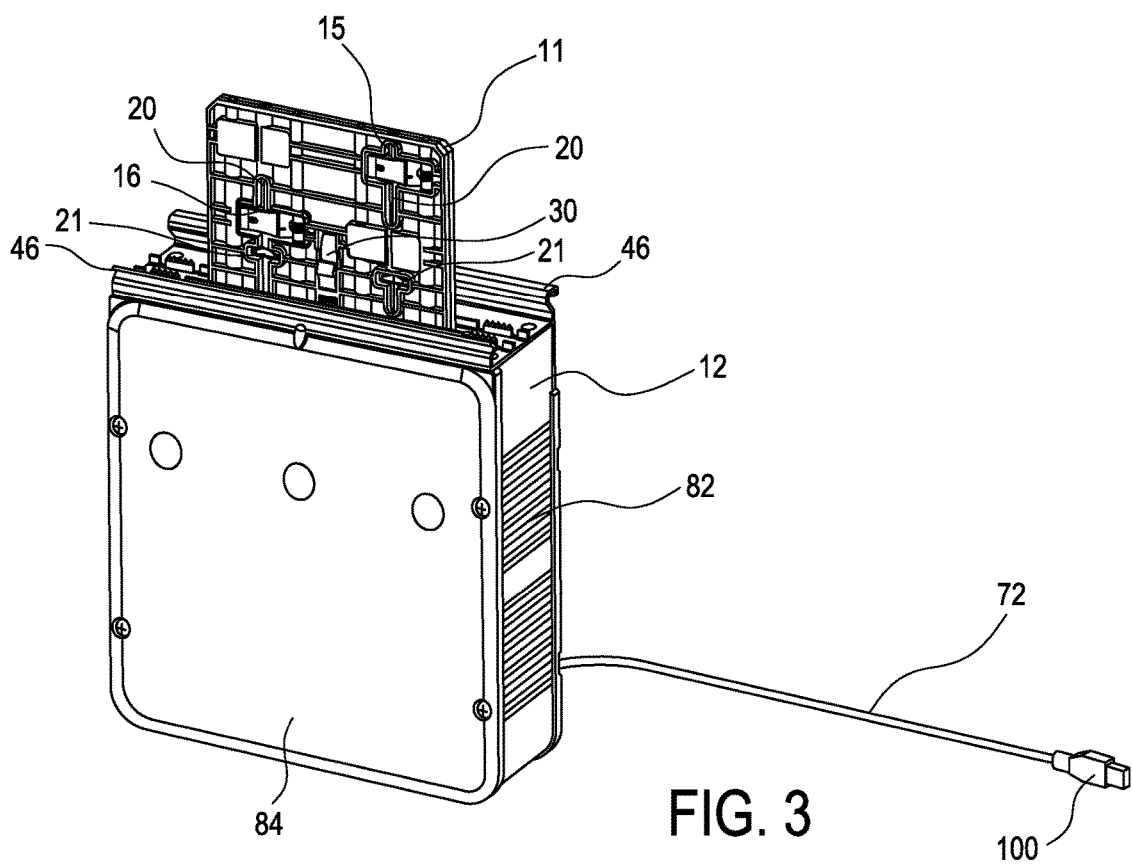
FIG. 3 is an isometric view, taken from the rear, of the tap-off box of the preferred embodiment.

In operation, the knob is initially on the left side as shown in FIG. 2. In this position, the posts 20 are in a position in which the spring contacts 13-16 rest against or are flush with the mast 11, allowing insertion of the mast 11 into the busway. Following insertion of the mast 11 into the busway, the knob 26 is slid to the right side of guide slot 27, moving the crank posts 24 to cause rotation of the cylindrical bases 22, which causes posts 20 to rotate. Rotation of the posts 20 cams the distal conductor-engaging edges 19 of spring contacts 13-16 away from the mast 11 and into engagement with the conductors 3 in the busway. Knob 26 can then be rotated to cause it to clamp the housing 12 of the tap-off box between the knob 26 and the slider 25, preventing lateral movement of the knob 26 and locking the spring contacts 13-16 in the conductor-engaging position.

The configuration of the camming mechanism and spring contacts of the preferred embodiment illustrated herein may be the same as configuration of the camming mechanism and contacts in the PowerWave™ systems sold by Power Distribution, Inc. However, those skilled in the art will appreciate that the camming mechanism and spring contacts may also be varied without departing from the scope of the invention. Furthermore, unlike the conventional tap-off box connection system, the present invention adds an automatic latching arrangement that engages upon full insertion of the mast 11 into the busway, to hold the tap-off box in position before the spring contacts are engaged, and to permit the spring contacts to be disengaged by manipulation of knob 26 while the tap-off box is still securely locked in position.

The latching mechanism of the present invention is best viewed in FIGS. 5-12, and includes a single one-piece latch member 30 having a latch head 31 with a busway engaging surface 32 and an inclined cam surface 33, a main body with a pivot notch 34, a lower extension 35 with a pushing surface 36, and a spring mounting slot 37 or integrated spring 38. The pivot notch receives a pivot post 39 positioned in an opening 40 in the mast 11, as shown in FIG. 4. The busway engaging surface 32 is arranged to engage a top surface 42 of one of the sub-channels 9 in the busway of FIG. 1, but those skilled in the art will appreciate that the latch head 31 and busway engaging surface 32 may be arranged to latch onto horizontal surfaces of a busway other than the illustrated surface, including surfaces not associate with sub-channels, depending on the design of the busway, and that the invention is not limited to use with the busway of FIG. 1 or the particular latch member shape or structure illustrated in FIGS. 5-12. For example, the pivot notch 34 may be replaced by a hole or by an axle extending from the latch member 30.

The latch member 30 is biased to pivot to the latching position by a separate spring fitted into slot 37, or by the integrated spring 38. During insertion of the mast 11 into the busway, the inclined cam surface 33 first encounters a lower portion of the sub-channel 9, as shown in FIG. 5, or any structure between the latch head 31 and the latch-engaging top surface 42. The latch member 30 is then caused to pivot around post 39, against the force of the spring bias, until the mast 11 is inserted into the busway by an amount sufficient to enable the latch head 31 to clear the sub-channel 9 or other structure, as shown in FIG. 6, at which time the latch pivots in response to the spring bias and automatically engages the top surface 42 to latch the mast 11 within the busway and prevent removal of the tap-off box. At this time, the spring contacts 13-16 are positioned to face conductors 3, and may be safely moved into engagement with the conductors by manipulation of knob 26, as described above. In addition, completion of mast insertion results in independent ground springs 44, if provided, being positioned within corresponding slots in the busway, and rails 46, which extend from the top of the tap-off box, having engaged the busway housing 1.

While engagement of the latching mechanism is automatic, disengagement is provided by an unlatching mechanism that includes an unlatching member 47 having an elongated main body 471 from which extends a central pusher 48 for engaging the pushing surface 36 of the latch member 30, integral or attached springs 49 for biasing the unlatching member 47 to a position in which the pusher 48 is disengaged from the pushing surface 36, and buttons 50 for causing the unlatching member 47 to move against the spring bias and cause the pusher 48 to engage the pushing surface 36. Further movement of the pusher 48 and pushing surface 36 in response to pushing of buttons 50 then causes the latch member 30 to pivot against its own spring bias, and busway engaging surface 32 to disengage from top surface 42 so that the tap off box can be removed from the busway. The use of two buttons 50 at opposite sides of the pushing member forces the operator to firmly grasp the tap off box by, for example, placing the operator's fingers on a surface of the housing 12 opposite the surface from which the buttons extend, on both sides of the box, and to simultaneously push on both buttons 50 by using the operator's thumbs in order to move the pusher 48 far enough to cause disengagement, thereby preventing premature or unintentional unlatching of the tap-off box and ensuring that the operator's hands are in a position to safely remove the tap off box by pulling vertically on both sides of the housing 12.

Figure 13:
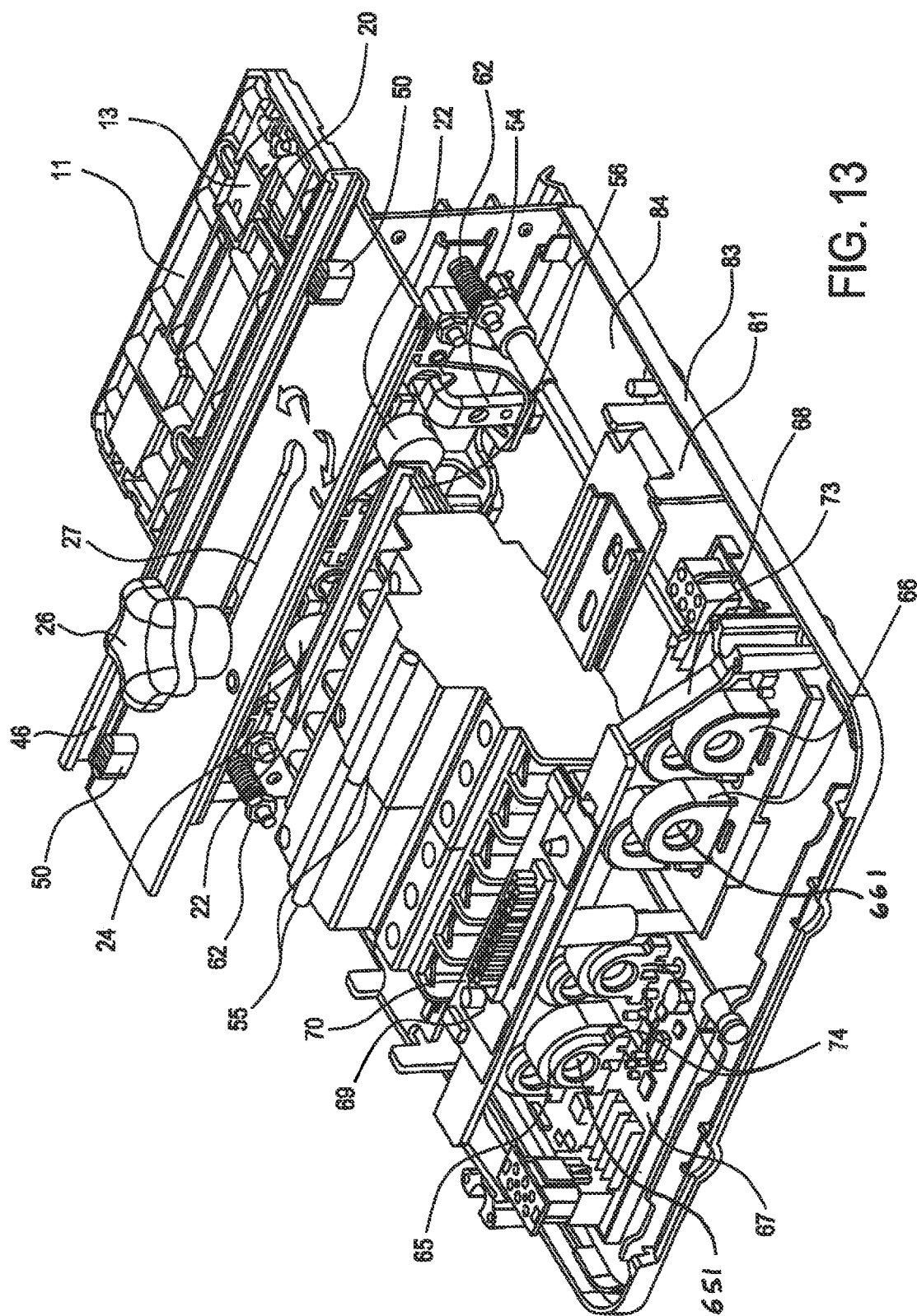
FIG. 13 is an isometric view showing interior components of the tap-off box of the preferred embodiment, with removed side and front panels.

FIGS. 13 and 14 show the interior of the tap-off box of the preferred embodiment, which the front and sides of the housing removed. Housing 12 contains power distribution and monitoring circuitry, including circuit breakers, bus bars, and current sensors, as will be described below.

Each of the spring contacts 13-16 is electrical connected by respective wires (not shown) that extend through the mast to terminals 54 positioned near a top of the tap-off box. Terminals 54 are connected to the circuit breakers 55 by a laminated bus system 56 made up of four plates 57-60 shown respectively in FIGS. 15a to 15d, which distribute the current supplied through the four spring contacts 13-16 and corresponding terminals 54 into two branch circuits. Parts 57-60 are in the form of conductive plates with appropriately positioned terminals and laminated together with insulation layers to form a unitary assembly that can easily be installed in the tap-off box as a unit, and that can be customized for different circuit breaker and branch circuit configurations by forming the plates 57-60 to have appropriately positioned terminals. It will be appreciated that the circuit and circuit breaker configurations, including the number of spring contacts and bus conductors, and the number of branch circuits, may be varied without departing from the scope of the invention. To this end, the use of the laminated bus assembly, which is preferred but not required, makes it possible to more easily vary the branch circuit configuration. Furthermore, in order to better accommodate different types of breakers or breakers with different current capacities, the breakers 55 are optionally mounted on an adjustable height mounting bracket 61.

The downstream sides of the circuit breakers 55 and ground terminals 62 are connected by wires (not shown) to output connectors or receptacles 63,64 having selected alternative configurations, as will be described below. in connection with FIGS. 20 and 21. The wires extend in conventional fashion through respective central openings 651, 661 in current sensors 65,66, which are connected to a field replaceable monitoring module 71 via respective printed circuit boards 67,68 and an interposer printed circuit board 69 containing an output connector 70. The monitoring module 71 contains circuitry for providing an output monitoring signal via a communications cable 72 that can, for example, be attached to a databus carried by one of the channels 9 in the busway. Those skilled in the art will appreciate that monitoring module 71 and communications cable 72 may be replaced by a different format module and connector as desired. The interposer printed circuit board 69 is preferably positioned above sensor circuit boards 67,68 to save space, with connection between the circuit boards being provided by one or more jumpers or ribbon cables 73. It will be appreciated that the configuration of the respective circuit boards 67-69, output connector 70, monitoring module 71, and related components may be varied without departing from the scope of the invention.

As illustrated in FIGS. 13 and 14, the current sensors 65,66 are non-contact, single phase CT current sensors that surround the branch circuit connection wires extending between the output receptacles and the circuit breakers 55. Such sensors are typically made up of wire wound toroidal coils on a metallic or nonmetallic core and enclosed within a plastic housing that may be mounted to the circuit board and electrically connected via terminals connected to the toroidal coils, and are commercially available. As a result, the sensors 65,66 may be freely varied without departing from the scope of the invention, except to the extent that the current sensors 65, 66 are capable of receiving voltage sensing inserts 74.

Figure 25:
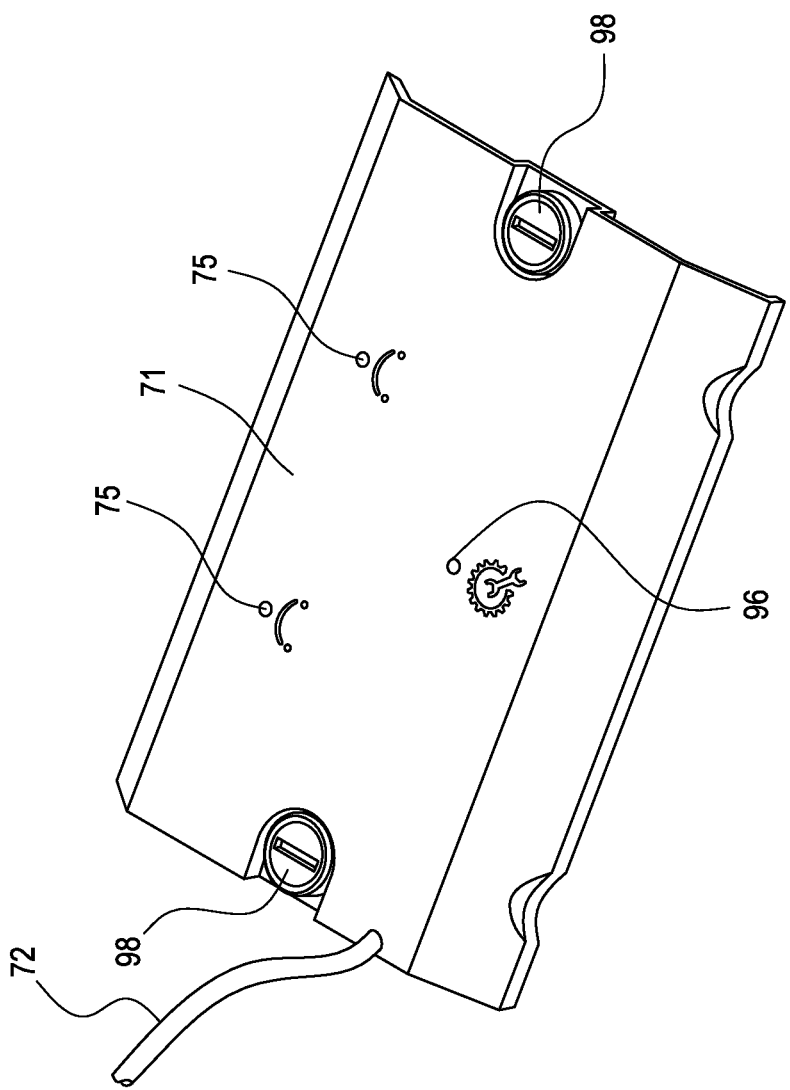
FIG. 25 is an isometric view of the monitoring unit of FIG. 24.
Figure 26:
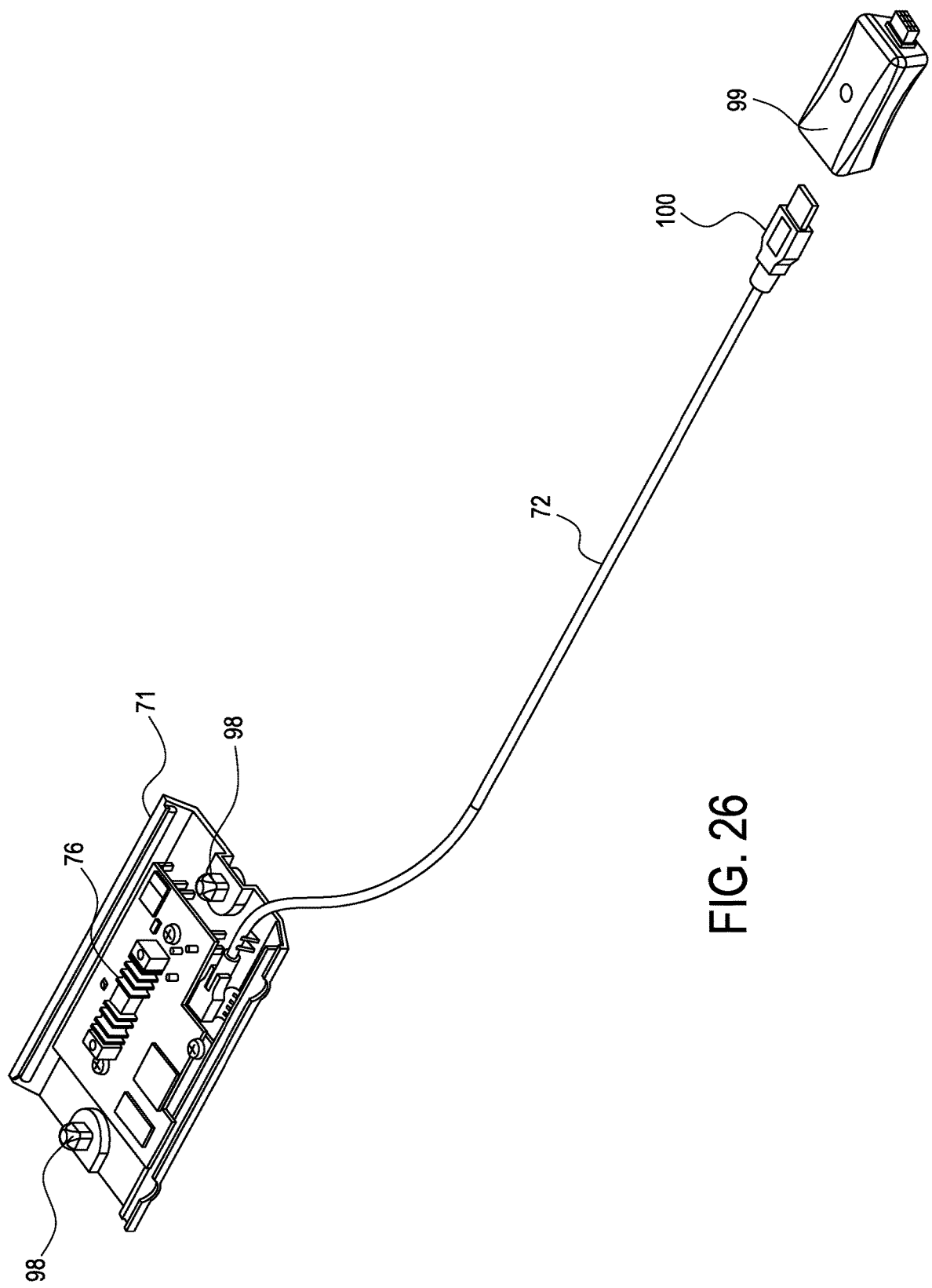
FIG. 26 is an isometric view of the monitoring unit of FIG. 24, with cover removed.

The voltage sensing inserts 74 replace the auxiliary breaker switches commonly used to detect tripping of the breaker based on breaker contact positions, and may be made up of a generally annular, plastic or graphite encased non-contact voltage sensor element that may be positioned on the printed circuit board 67 adjacent respective non-contact current sensors 65 to detect voltages in wires passing through the central openings 651 of the current sensors 65. As is well known, non-contact voltage sensing elements may take a variety of forms, such as a capacitive plate or wire (not shown). In order to detect tripping of the breaker, the voltage sensing elements are arranged to output a signal upon detecting a change in voltage that results when the breaker goes from a closed position to an open position. Rather than being connected to the current monitor, the signal-outputs of the insert are connected to monitoring and indicator circuitry that would otherwise be connected to the auxiliary switch. The auxiliary switch monitoring circuitry may, for example, control breaker operation indicator lights 75 on the monitoring module 71, as shown in FIG. 25. Monitoring module 71 preferably further includes a blind connector 76, shown in FIG. 26, for connection to the output connector 70 of the monitoring module, which is situated on the interposer printed circuit board 69.

Figure 16:
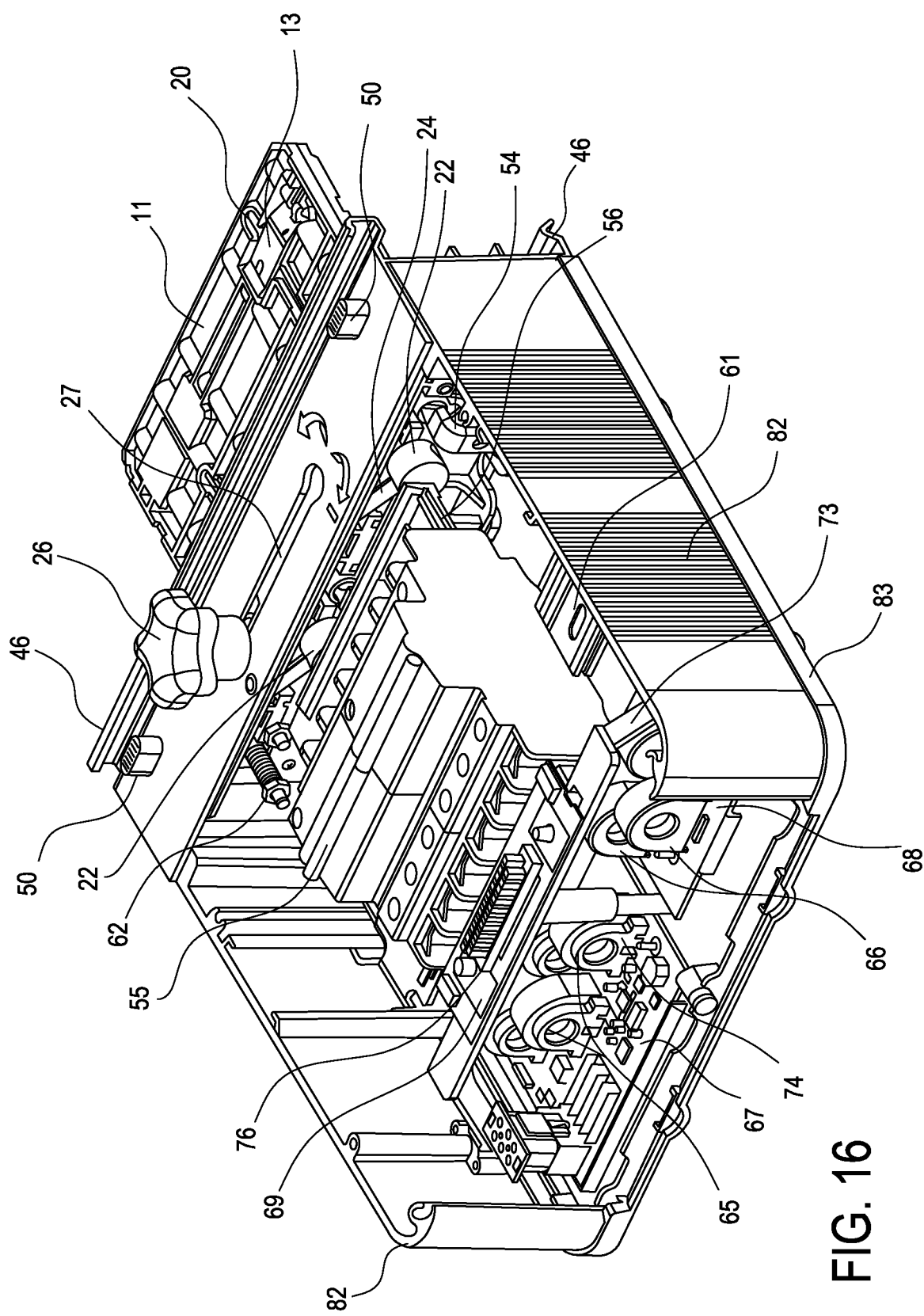
FIG. 16 is an isometric view of the tap-off box of the preferred embodiment, including side panels but with front and receptacle panels removed.

FIG. 16 shows a side plate arrangement for the tap-off box housing 12 of the preferred embodiment. The side plates 82 illustrated in FIG. 16 are extruded aluminum panels that provide enclosure rigidity and strength as well as grounding continuity, and that are arranged to fit within a flange 83 of a back panel 84. By varying the width of the side plates 82, top panel or cover 90 (see FIGS. 2, 22, and 23), and a receptacle panel 85 (shown in FIG. 19B), the thickness of the tap off box may be varied to accommodate different size receptacles 63,64 and/or breakers 55.

Figure 19A:
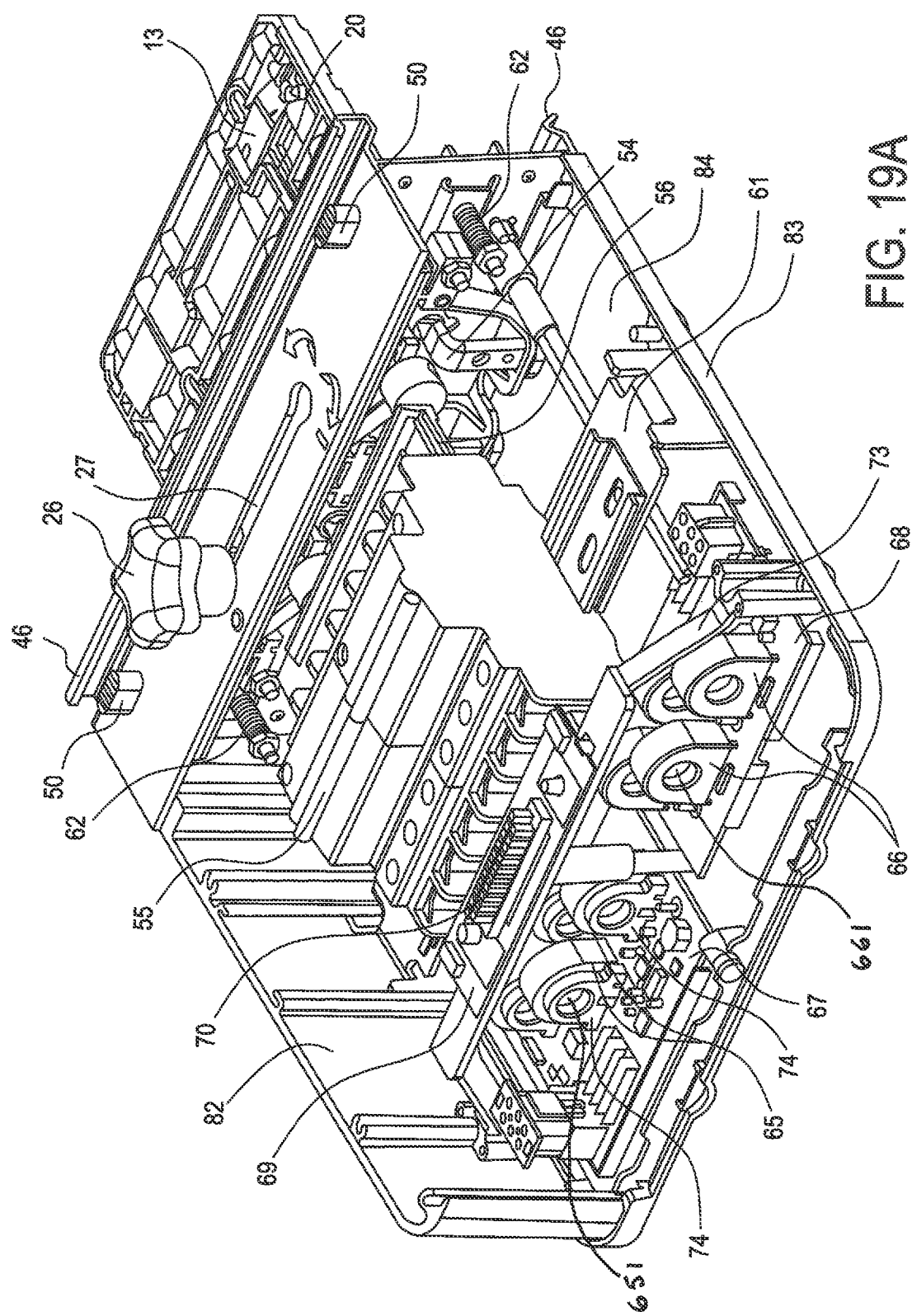
FIGS. 19A and 19B are isometric views showing the tap-off box of the preferred embodiment, with front panel removed, with and without side and receptacle panels.
Figure 19B:
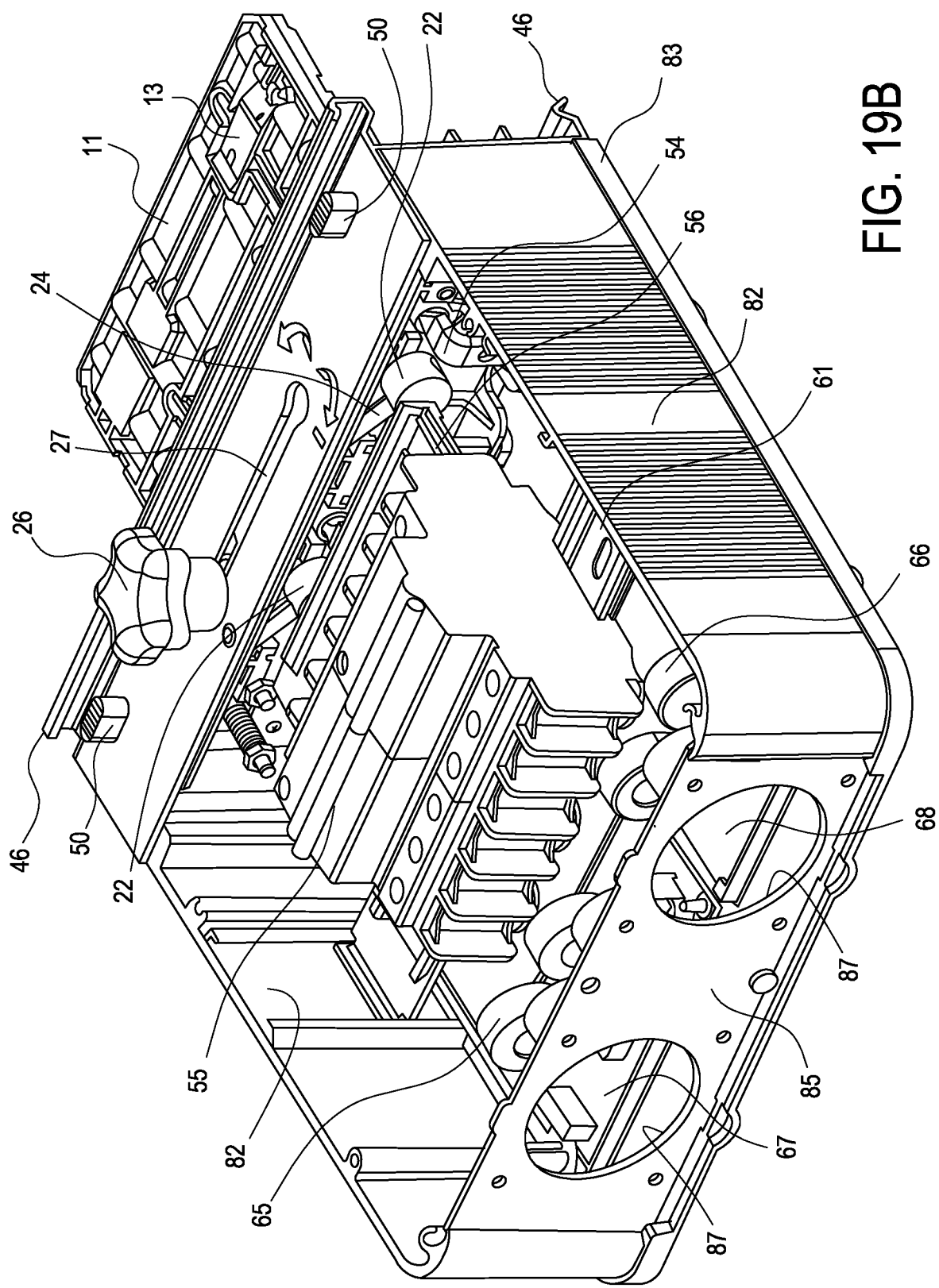

The receptacle panel 85 shown in FIG. 19B fits within slots 86 formed in the side plates 82 to ensure electrical ground continuity, and include openings 87 of various shapes to accommodate different sizes or types of receptacles such as, by way of example and not limitation, the IEC version receptacles 63 shown in FIG. 20 and the NEMA version receptacles 64 shown in FIG. 21.

Those skilled in the art will appreciate that it is also within the scope of the invention to provide side panel or receptacle arrangements other than the illustrated arrangements, including arrangements in which the top, side, and bottom panels or plates are integral with the back or front panels, or formed in one piece therewith, and arrangements in which the receptacles are provided with adapters or extenders 88 to leave more room within the enclosure for bigger wires or cables. It is also possible, as shown in FIGS. 20 and 21, to provide one or more panels with an adapter such as the cover adapter 89 to increase the width to match the width of other panels or plates and allow increased enclosure depth.

Figure 23:
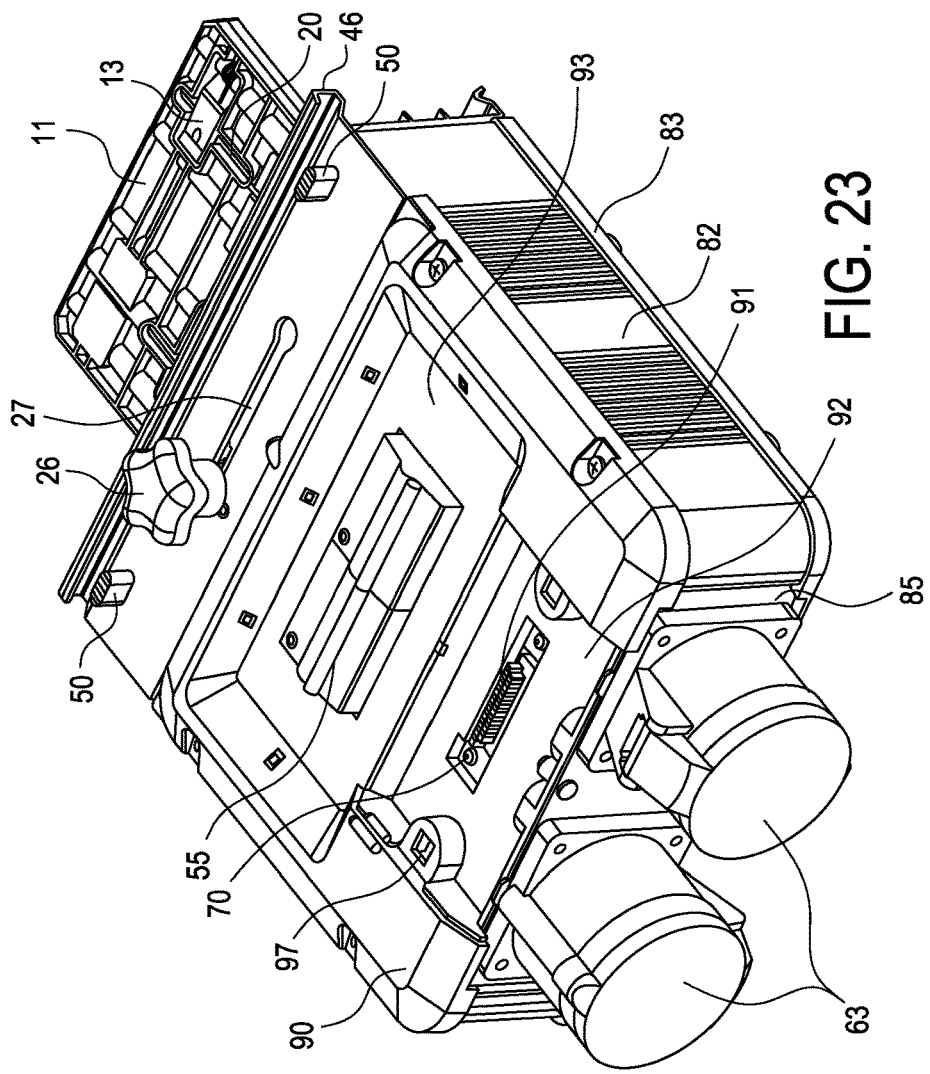
FIGS. 22 and 23 are isometric views of the tap-off box of the preferred embodiment, including a variable configuration breaker faceplate.
Figure 22:
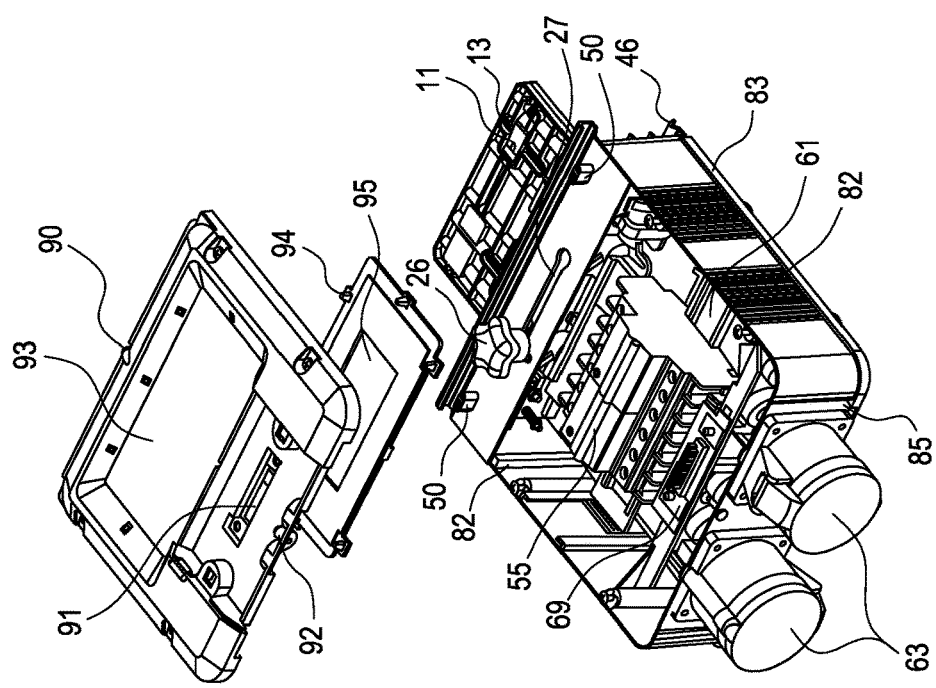

As shown in FIGS. 22 and 23, the front panel or cover 90 preferably includes not only an opening 91 for the output connector 70 and a recess 92 for the monitoring module 71, but also an opening 93 for receiving a field replaceable breaker faceplate 94. The field replaceable breaker faceplate 94 may have various configurations to accommodate different types of breakers, and includes a plate 95 that is transparent to infrared radiation to enable infrared scanning of the breakers from outside the tap-off box, without having to remove the front panel or cover 90.

Figure 24:
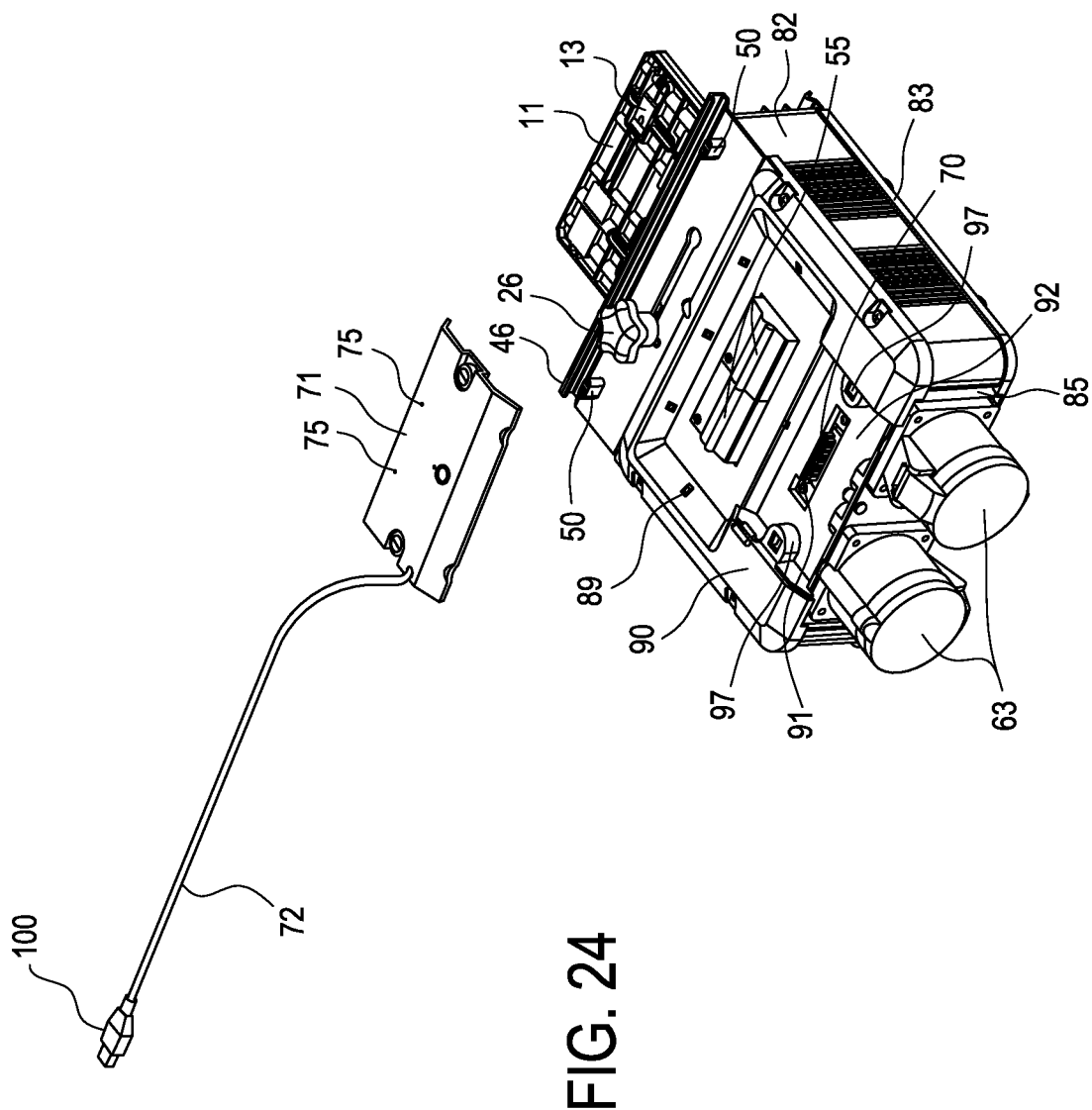
FIG. 24 is an isometric view of the tap-off box of the preferred embodiment, showing a field replaceable monitoring unit.

Finally, as shown in FIG. 24, the monitoring module 71 may optionally also include one or more additional light emitting diode (LED) indicator lights 96 to, for example, provide an indication that maintenance is required. To facilitate replacement of the faceplate 94, the recess 92 may include posts 97 for receiving captive quarter turn fasteners 98 or similar fastening members. In addition, an adapter 99 may be provided to enable connection of the illustrated jack 100 with a Molex type micro-fit connector provided in the busway. Those skilled in the art will appreciate that the monitoring unit may use any of a variety of different communications protocols and jacks or adapters without departing from the scope of the invention.

What is claimed is:

1. A tap-off box distributing power from a busway of an electrical power distribution system, the tap-off box comprising:
   a housing including power distribution and monitoring components;
   a mast that extends from the housing and includes a plurality of electrical contacts for engagement with respective conductors in the busway; and
   a snap-on latching mechanism that includes a spring-biased latch member pivotally attached to the mast, wherein the latch member has a busway engaging surface that engages an upper surface of a structure in the busway, the latch member further including an inclined cam surface that engages a lower surface of the busway structure and causes the latch member to pivot in a first direction as the mast is inserted into the busway, the latch member being moved in a second direction by the spring-bias into a latching position in which the horizontal engaging surface engages the upper surface of the busway structure to latch the tap-off box into the busway after the latch member has moved past the busway structure upon full insertion of the mast into the busway; and
   an unlatching mechanism positioned adjacent the latch member to engage and pivot the latch member in said first direction upon actuation by an installer to enable removal of the tap off box from the busway.

2. The tap-off box as claimed in claim 1, wherein the spring-bias is provided by a spring that is integral with the latch member.

3. The tap-off box as claimed in claim 1, wherein the spring-bias is provided by a plate spring inserted into a slot in the latch member.

4. The tap-off box as claimed in claim 1, wherein the unlatching mechanism includes an unlatching member having a pusher, and the latch member includes a lower surface engageable with the pusher to cause pivoting of the latch member upon being engaged and pushed by the unlatching member towards the latch member.

5. The tap-off box as claimed in claim 4, wherein the unlatching member includes an elongated main body having said pusher extension at a center and buttons at opposite ends, wherein pushing on the buttons causes the unlatching member to move towards the latch member and cause the latch member to pivot in the first direction.

6. The tap-off box as claimed in claim 1, wherein the electrical contacts are spring contacts attached at one end to the mast, and further comprising a contact engaging mechanism that includes a plurality of camming posts rotatably mounted in the mast and positioned such that cam surfaces of the camming posts are adjacent respective spring contacts, wherein when the camming posts are rotated, the spring contacts are cammed by the camming surfaces into engagement with the conductors.

7. The tap-off box as claimed in claim 6, wherein the camming posts are actuated by a slidable knob and wherein the slidable knob is rotatable to lock the electrical contacts in an engagement position.

8. The tap-off box as claimed in claim 1, wherein the power distribution and monitoring components include:
   circuit breakers configured to be electrically connected to the electrical contacts and to output receptacles of the tap off box; and
   non-contact current monitoring sensors, each having a central opening and positioned between the circuit breakers and the output receptacles of the tap-off box.

9. The tap-off box as claimed in claim 8, further comprising a voltage sensing insert installed in the central opening of at least one of the non-contact current monitoring sensors, the voltage sensing insert including an annular voltage-sensing section that also surrounds the respective individual wire that passes through the at least one non-contact current monitoring sensor, wherein the at least one non-contact current monitoring sensor is installed on a first circuit board and the voltage sensing insert is electrically connected to a circuit that detects a status of the circuit breaker based on detection by the voltage sensing insert of an open or closed circuit condition.

10. The tap-off box as claimed in claim 9, further comprising a monitoring module that includes at least one LED viewable from an exterior of the housing for indicating a status of the circuit breaker as detected by the voltage sensing insert.

11. The tap-off box as claimed in claim 10, further comprising an interposer circuit board connected by a ribbon cable to the first circuit board, the interposer circuit board including a first connector arranged to be connected to a second connector in the monitoring module, the monitoring module being removably secured to a front panel of the tap-off box.

12. The tap-off box as claimed in claim 11, wherein the housing further includes a recess for removably receiving a current monitoring module.

13. The tap-off box as claimed in claim 11, wherein the housing includes a rear panel, a top plate from which the mast extends, a pair of side plates, a receptacle panel, and a front panel, and the side plates are replaceable by side plates of a different thickness to accommodate circuit breakers having different sizes.

14. The tap-off box as claimed in claim 11, wherein the housing includes a rear panel, a top plate from which the mast extends, a pair of side plates, a receptacle panel, and a front panel, and the receptacle panel is replaceable to accommodate different types of receptacles.

15. The tap-off box as claimed in claim 1, wherein the housing includes a rear panel, a top plate from which the mast extends, a pair of side plates, a receptacle panel, and a front panel, the front panel including an opening arranged to receive a variable configuration breaker faceplate made of a plastic material that allows IR scanning of circuit breakers within the housing.

16. A non-contact current monitoring assembly, comprising:

a non-contact current sensor including a toroidal winding that extends around a central opening for sensing a current in a wire passing through the central opening; and a voltage sensing insert positioned adjacent to the non-contact current sensor for detecting an open circuit condition of a circuit breaker connected to the wire, wherein the circuit breaker lacks an auxiliary breaker switch to detect tripping of the circuit breaker, tripping of the circuit breaker instead being detected based on an absence of voltage sensed by a voltage sensing insert in said wire passing through the central opening of the non-contact current sensor.

17. A tap-off box, comprising:

a housing that encloses power distribution and monitoring circuitry, wherein the housing includes a back panel, a top plate from which an electrical contact supporting mast extends, a pair of side plates, a receptacle panel, and a front panel, the front panel including an opening arranged to removably receive a variable configuration breaker faceplate made of a plastic material that transmits infrared to enable infrared scanning of the power distribution and monitoring circuitry from outside the housing, the variable configuration breaker faceplate being removable and replaceable by a different variable configuration breaker faceplate to accommodate different circuit breaker configurations.

18. The tap-off box as claimed in claim 17, wherein the housing further includes a recess for removably receiving a current monitoring module.

19. The tap-off box as claimed in claim 17, wherein the side panels are replaceable by side panels of a different thickness to accommodate circuit breakers having different sizes.

20. The tap-off box as claimed in claim 17, wherein the receptacle panel is replaceable to accommodate different types of receptacles.

* * * * *